(12) United States Patent
Marks et al.

(10) Patent No.: US 6,303,028 B1
(45) Date of Patent: Oct. 16, 2001

(54) PROTEIN SKIMMER

(76) Inventors: Neil Marks, Yehuda Ha'Levy 2/4, Ra'anana 43556; Eli Nissenberg, Hebanim 21, Ramat Hasharon 47216, both of (IL)

( * ) Notice: Subject to any disclaimer, the term of this patent is extended or adjusted under 35 U.S.C. 154(b) by 0 days.

(21) Appl. No.: 09/698,096

(22) Filed: Oct. 30, 2000

(30) Foreign Application Priority Data

Apr. 23, 2000 (IL) .......................................................... 135787

(51) Int. Cl.[7] .............................. C02F 1/24; A01K 63/04
(52) U.S. Cl. ...................... 210/169; 210/221.2; 119/263; 119/264
(58) Field of Search ................................. 210/169, 221.2; 119/263, 264

(56) References Cited

U.S. PATENT DOCUMENTS

| | | |
|---|---|---|
| 3,525,437 * | 8/1970 | Kaeding et al. . |
| 3,957,017 | 5/1976 | Carmignani et al. . |
| 3,965,007 | 6/1976 | Conn et al. . |
| 3,994,811 | 11/1976 | Cohen et al. . |
| 4,834,872 | 5/1989 | Overath . |
| 4,988,436 | 1/1991 | Cole . |
| 5,084,164 | 1/1992 | Del Rosario . |
| 5,282,962 | 2/1994 | Chen . |
| 5,385,665 * | 1/1995 | Neuhaus . |
| 5,484,525 | 1/1996 | Mowka, Jr. . |
| 5,554,280 * | 9/1996 | Loehr . |
| 5,562,821 * | 10/1996 | Gutierrez-Callazo . |
| 5,665,227 | 9/1997 | Watt . |
| 5,667,671 | 9/1997 | Munsch et al. . |
| 5,736,034 | 4/1998 | Phillips et al. . |
| 5,776,335 * | 7/1998 | Overath . |
| 5,800,704 * | 9/1998 | Hansen . |

* cited by examiner

*Primary Examiner*—Thomas M. Lithgow

(57) ABSTRACT

A foam fractionation protein skimmer for removing organic waste material from organic loaded water, the protein skimmer including an upright reaction chamber with an uppermost throat in flow communication with a foam collection cup for collecting a protein loaded foam containing the organic waste material. The chamber has a vertically directed partition with an uppermost portion terminating beneath the throat for partitioning the chamber into an upwardly converging inlet compartment and a downwardly diverging outlet compartment respectively having an inlet port and an outlet port downwardly remote from the throat, and a region of flow inversion for inverting an ingressing air/protein loaded water mixture upwardly flowing toward the throat to an egressing water flow downwardly flowing to the outlet port with an upward counterflow of protein bearing air bubbles The upward counterflow of air bubbles combines with foam fractionation occurring at the region of flow inversion to produce the protein loaded foam at the throat whereby the egressing water flow is less protein loaded than the ingressing air/protein loaded water mixture.

10 Claims, 2 Drawing Sheets

PROTEIN SKIMMER

FIELD OF THE INVENTION

The invention is in the field of foam fractionation protein skimmers for removing organic waste material dissolved in organic loaded water.

BACKGROUND OF THE INVENTION

Foam fractionation protein skimmers, for example, the Berlin(r) protein skimmer based on the teachings of U.S. Pat. No. 4,834,872, and commercially available from the Assignee of the present application, employ a naturally occurring foam fractionation action to produce a protein loaded foam containing organic waste material extracted from organic loaded water. Other protein skimmers are illustrated and described in inter alia U.S. Pat. Nos. 3,957,017, 3,965,007, 3,994,811, 4,988,436, 5,084,164, 5,282,962, 5,484,525, 5,665,227, 5,667,671, and 5,736,034.

SUMMARY OF THE INVENTION

In accordance with the present invention, there is provided a foam fractionation protein skimmer for removing organic waste material from organic loaded water, the protein skimmer comprising an upright reaction chamber with an uppermost throat in flow communication with a foam collection cup for collecting a protein loaded foam containing the organic waste material, said chamber having a vertically directed partition with an uppermost portion terminating beneath said throat for partitioning said chamber into an upwardly converging inlet compartment and a downwardly diverging outlet compartment respectively having an inlet port and an outlet port downwardly remote from said throat, and a region of flow inversion for inverting an ingressing air/protein loaded water mixture upwardly flowing toward said throat to an egressing water flow downwardly flowing to said outlet port with an upward counterflow of protein bearing air bubbles, said upward counterflow of air bubbles combining with foam fractionation occurring at said region of flow inversion to produce said protein loaded foam at said throat whereby said egressing water flow is less protein loaded than said ingressing air/protein loaded water mixture.

The foam fractionation protein skier of the present invention is designed to prolong the contact time between air bubbles and protein loaded water for improving the efficacy of a naturally occurring skimming action for producing a protein loaded stable foam. The contact time is prolonged by way of inducing Valence in the ingressing flow of organic loaded water flowing upwardly in the inlet compartment from the inlet port towards the foam collection cup, and in the region of flow inversion therebeneath. The turbulence is preferably induced by horizontally injecting an air/protein loaded water mite into the compartment towards the partition, configuring the inlet compartment to be upwardly converging, and creating a back pressure in the region of flow inversion by way of restricting the outward flow therefrom relative to the inward flow thereinto. Moreover, the outlet compartment of the foam fractionation protein skimmer of the present invention is designed to facilitate a counter flow of protein bearing air bubbles from the egressing downward water flow such that clear non-aerated water is immediately available for recirculation.

BRIEF DESCRIPTION OF THE DRAWINGS

In order to understand the invention and to see how it may be carried out in practice, preferred embodiments will now be described, by way of non-limiting examples only, with reference to the accompanying drawings, in which similar parts are likewise numbered, and in which.

DETAILED DESCRIPTION OF THE DRAWINGS

Figure 1:
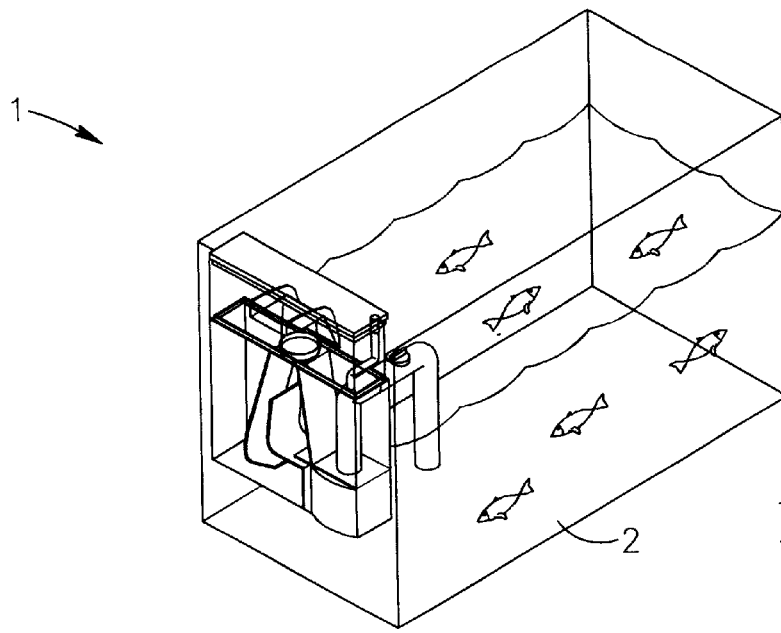
FIG. 1 is a pictorial representation of a foam fractionation protein skimmer of the present invention hung on an end wall of an aquarium.
Figure 2:
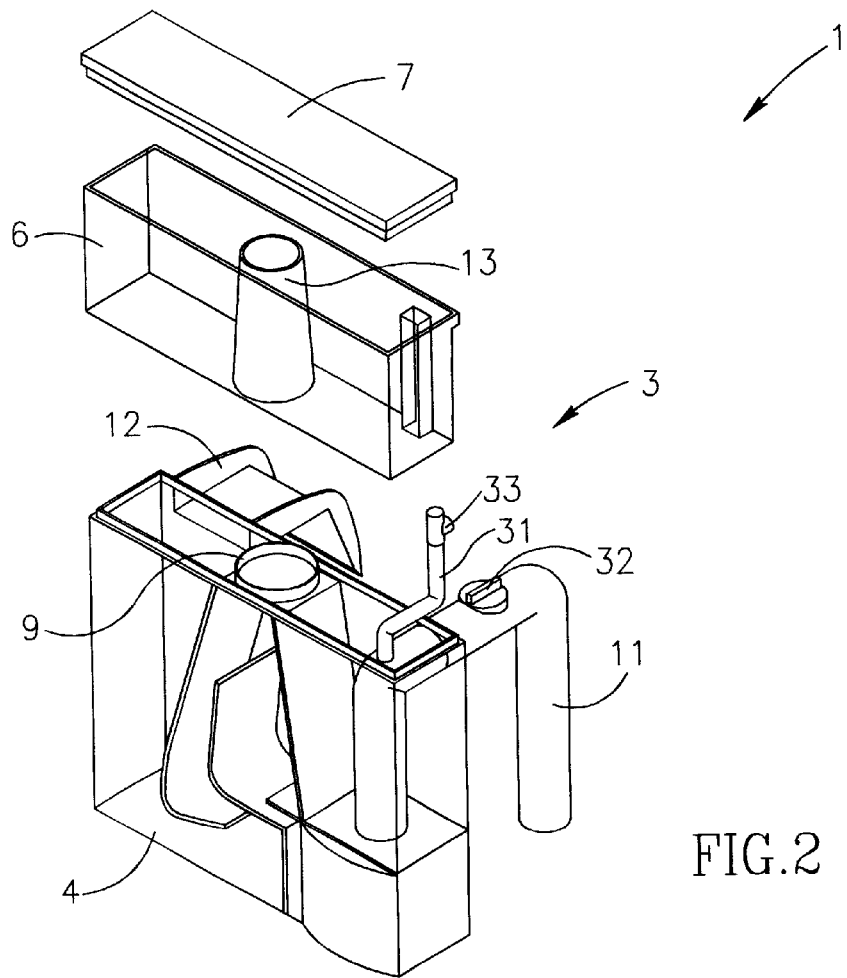
FIG. 2 is a pictorial representation of the foam fractionation protein skimmer of FIG. 1.
Figure 3:
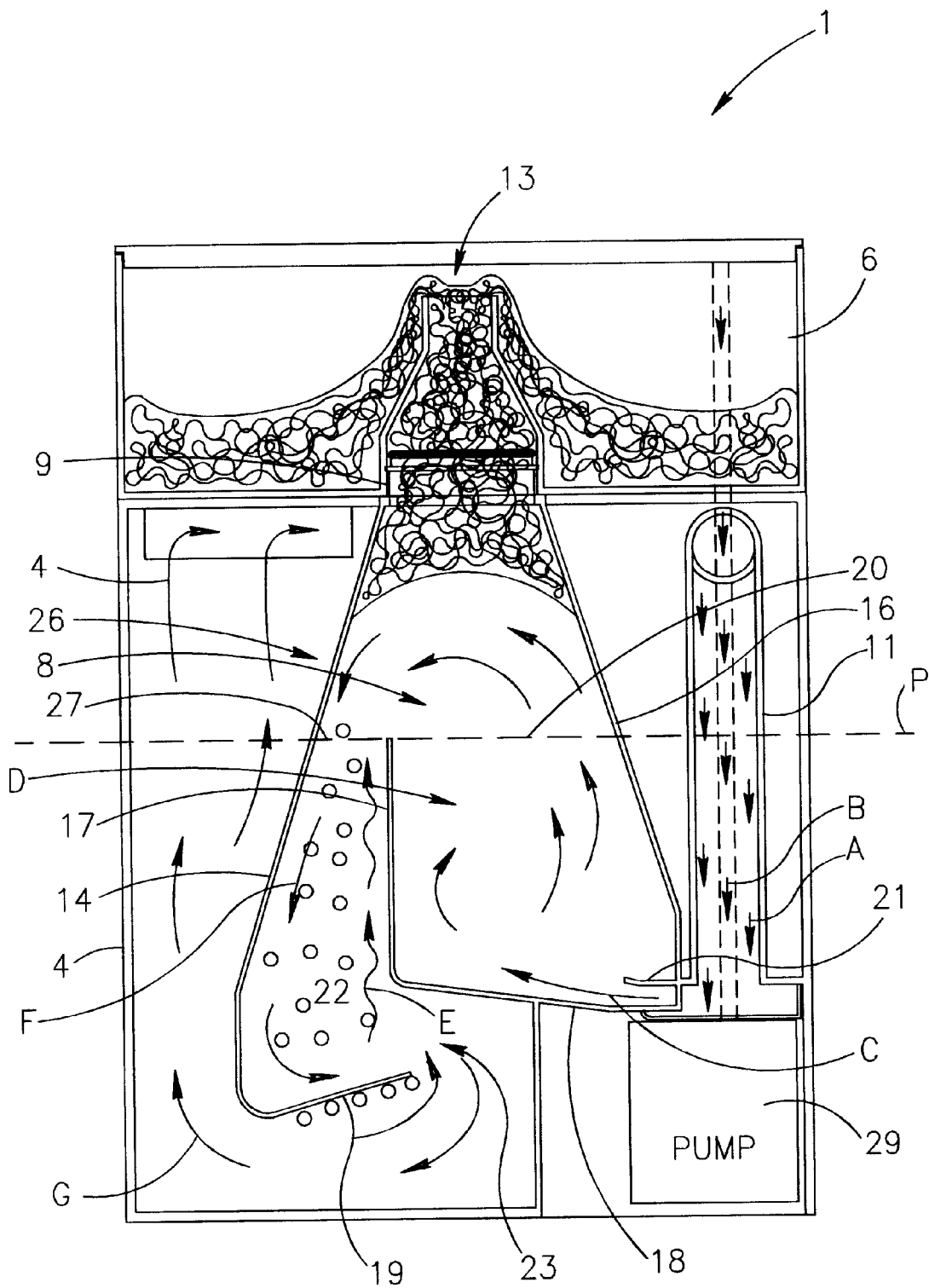
FIG. 3 is a front pictorial representation of the foam fractionation protein skimmer of FIG. 1 in operation.

With reference to FIGS. 1–3, a foam fractionation protein slimmer 1 is externally hung from an aquarium end wall 2 for removing organic waste material from aquarium water. The protein skimmer 1 includes an upright, generally prismatoidal two part housing 3 having a lower open-topped main body 4, and an upper foam collection cup 6 for collecting protein loaded foam. The main body 4 includes a centrally disposed inverted V shaped reaction chamber 8 with an uppermost throat 9, an U-shaped inlet pipe 11 on its right side, and a water outlet chute 12 on its left side. The foam collection cup 6 includes a centrally disposed foam collection duct 13 snap fittable on the reaction chamber's throat 9, and has a lid 7.

The reaction chamber 8 includes downwardly diverging left and right side walls 14 and 16, and a vertically directed partition 17 extending downward from the middle of the reaction chamber 8 to the left end of a generally horizontal right bottom wall 18 joining the bottom end of the right side wall 16. The left side wall 14 extends downwardly beyond the right bottom wall 18 and terminates in a left bottom wall 19 transversely directed with respect to the left side wall 14 and upwardly inclined toward the juncture of the partition 17 and the right bottom wall 18. In this manner, the reaction chamber 8 is divided into a right side upwardly converging inlet compartment 19 with a horizontally directed inlet port 21 at the juncture between the right side wall 16 and the right bottom wall 18, a leftside downwardly diverging outlet compartment 22 with an outlet port 23 defined by the separation between the tip of the left bottom wall 19 and the right bottom wall 18, and a region of flow inversion 24 for inverting an ingressing upward flow in the inlet compartment 19 to an egressing downward flow in the outlet compartment 22. Flow restriction means 26 is provided at the outlet of the region of flow inversion 24 to induce back pressure therein, the flow restriction means being constituted by an outlet aperture 27 of the region of flow inversion 24 having a smaller cross sectional area than an inlet aperture 28 on the side of the inlet compartment 19 in an imaginary horizontal plane P passing through the tip of the partition 17.

The protein skimmer 1 includes a centrifugal pump 29 connected to the water inlet pipe 11 and an air inlet pipe 31 having a lower portion centrally disposed in the water inlet pipe 11 and an upper portion extending up the outside of the foam collection cup 6. The pump 29 horizontally injects a stream of an air/protein loaded water mixture through the inlet port 21 in the direction of the partition 17, thereby inducing turbulence in the inlet compartment 19. The water inlet pipe 11 is provided with a flow regulator 32 for regulating the flow of water siphoned into the pump 29 and the air inlet pipe 31 is provided with a horizontally disposed needle valve 33 employed for priming the pump 29.

The operation of the foam fractionation protein skimmer 1 is as follows:

The protein skimmer is hung on an aquarium's side wall by its water inlet pipe and water outlet chute. The water inlet port is submerged under water, the needle valve is closed, and the pump is actuated to siphon water thereinto denoted A and to initiate circulation of water through the protein skimmer. The needle valve is opened to enable an intake of air denoted B to create an ingressing air/protein loaded water mixture flow denoted C consisting of a constant swam of super-fine air bubbles in a homogenous air/water mixture into the inlet compartment. The flow of water through the water inlet pipe and the intake of air via the air inlet pipe are independently regulated to induce considerable turbulence denoted D both in the inlet compartment and, in particular, in the region of flow inversion. The respective rates of water depend on several factors including inter alia the height of water in the aquarium, and the degree of protein loading in the water. Typically, the height of water in the foam collection duct is between about 1 can to 2 cm above the height of the water outlet chute by virtue of the backpressure in the reaction chamber, and in particular the region of flow inversion. The turbulence lends to foam fractionation in the region of flow inversion for forming a protein loaded foam which rises in the foam collection duct and eventually spills into the foam collection cup. The foam fractionation is combined with an upward flow of protein bearing air bubbles denoted E flowing in a counter direction to the egressing downward flow of at least partially protein alleviated water denoted F towards the outlet port. Stray air bubbles which are entrained through the outlet port float upwardly against the underside of the lowermost surface of the left bottom wall and upwardly slide therealong against the egressing water flow before returning to the outlet compartment prior to their joining the counter flow of air bubbles flowing toward the foam collection cup. Treated relatively protein free water flows upwardly denoted G from the outlet port towards the water outlet chute where it cascades thereover denoted H into the aquarium for circulation. The foam collection cup is periodically removed for cleaning.

While the invention has been described with respect to a limited number of embodiments, it will be appreciated that many variations, modifications and other applications of the invention can be made within the scope of the appended claims. For example, alternative configurations of a reaction chamber include inter alia a truncated pyramidal configuration of which the preferred example is a particular case, and a tubular configuration with concentric inlet and outlet compartments. Also, an air stone can be deployed within an inlet compartment for creating an air/protein loaded water mixture in situ in contradistinction to the preferred embodiment. And, the flow restriction means can be implemented by baffles, and the like.

What is claimed is:

1. A foam fractionation protein skimmer for removing organic waste material from organic loaded water, the protein skimmer comprising an upright reaction chamber with an uppermost throat in flow communication with a foam collection cup for collecting a protein loaded foam containing the organic waste material, said chamber having a vertically directed partition with an uppermost portion terminating beneath said throat for partitioning said chamber into an upwardly converging inlet compartment and a downwardly diverging outlet compartment respectively having an inlet port and an outlet port downwardly remote from said throat, and a region of flow inversion for inverting an ingressing air/protein loaded water mixture upwardly flowing toward said throat to an egressing water flow downwardly flowing to said outlet port with an upward counterflow of protein bearing air bubbles, said upward counterflow of air bubbles combining with foam fractionation occurring at said region of flow inversion to produce said protein loaded foam at said throat whereby said egressing water flow is less protein loaded than said ingressing air/protein loaded water mixture.

2. The skimmer according to claim 1 wherein said reaction chamber has a truncated pyramidal configuration.

3. The skimmer according to claim 2 wherein said reaction chamber has a inverted V-shaped prismatoidal configuration.

4. The skimmer according to claim 1 wherein said inlet compartment is continuously upwardly converging for inducing turbulence in said ingressing air/protein loaded water mixture.

5. The skimmer according to claim 1 wherein said outlet compartment is continuously downwardly diverging for facilitating a counter flow of protein bearing air bubbles to said egressing water flow.

6. The skimmer according to claim 1 and further comprising a centrifugal pump integrally formed therewith, and in flow communication with a water inlet pipe and an air inlet pipe for horizontally injecting an air/protein loaded water mixture into said inlet compartment.

7. The skimmer according to claim 6 wherein said air inlet pipe is generally vertically directed and includes a lower portion centrally disposed in said water inlet pipe and an upper portion extending up the outside of said foam collection cup.

8. The skimmer according to claim 1 and further comprising a U-shaped water inlet pipe in flow communication with said inlet port and a water outlet chute in flow communication with said outlet port, said inlet pipe and said outlet chute being employable for externally hanging the skimmer on an aquarium.

9. The skimmer according to claim 1 and further comprising an air bubble trap downstream of said outlet port for returning air bubbles escaped from said outlet compartment thereto.

10. The skimmer according to claim 1 and further comprising flow restriction means provided upstream of said region of flow inversion to induce a backpressure therein.

* * * * *